United States Patent [19]

Krone et al.

[11] Patent Number: 5,791,133
[45] Date of Patent: Aug. 11, 1998

[54] ROTARY RAKE FOR A HAY MAKING MACHINE

[75] Inventors: Bernard Krone, Spelle; Josef Horstmann, Ibbenbüren, both of Germany

[73] Assignee: Maschinenfabriken Bernard Krone GmbH, Spelle, Germany

[21] Appl. No.: 592,213

[22] Filed: Jan. 26, 1996

[30] Foreign Application Priority Data

Jan. 28, 1995 [DE] Germany .................. 195 02 710.8

[51] Int. Cl.[6] ............................................ A01D 78/12
[52] U.S. Cl. ........................ 56/367; 56/377; 56/396
[58] Field of Search ........................ 56/367, 370, 377, 56/379, 380, 396, 376, 378

[56] References Cited

U.S. PATENT DOCUMENTS

| | | | |
|---|---|---|---|
| 4,062,174 | 12/1977 | Knuesting | 56/370 |
| 4,166,352 | 9/1979 | Knuesting | 56/370 X |
| 5,024,053 | 6/1991 | Aron | 56/377 X |
| 5,548,949 | 8/1996 | Gantzer | 56/377 X |

FOREIGN PATENT DOCUMENTS

| | | |
|---|---|---|
| 0 130 617 | 1/1985 | European Pat. Off. . |
| 0 590 311 | 4/1994 | European Pat. Off. . |
| 2 110 930 | 9/1971 | France . |
| 1 960 236 | 6/1970 | Germany . |
| 2 059 269 | 6/1971 | Germany . |
| 1 782 006 | 1/1972 | Germany . |
| 499 951 | 12/1970 | Switzerland . |

*Primary Examiner*—Terry Lee Melius
*Attorney, Agent, or Firm*—Herbert Dubno; Yuri Katzshov

[57] ABSTRACT

A rotary rake for a hay making machine has prong brackets rotating about a substantially vertically aligned axis and having prongs at their outer ends and provided with respective eccentrically positioned cam rollers within the gyro casing and with respective journal bearings axially locked on the prong brackets, so that a compact subassembly is formed which is adapted to be introduced into and to be locked in at least two apertures within the gyro casing positioned one behind the other in a spaced relationship.

14 Claims, 7 Drawing Sheets

ROTARY RAKE FOR A HAY MAKING MACHINE

FIELD OF THE INVENTION

The invention is a rotary rake for a hay making machine, especially for a rotary windrower whose prong brackets rotate about a substantially vertically aligned axis and are provided with prongs at their outer ends, the prong brackets being rotatably supported in journal bearings within a closed gyro casing and being controlled by means of a cam.

BACKGROUND OF THE INVENTION

Rotary rakes having a closed gyro casing are known to have brackets provided with prongs. The brackets are rotatable and are controlled by a cam located within the gyro casing.

In Swiss patent no. 499 951 and the analogous German disclosure letter 19 60 236 a hay making machine has at least one rake wheel which can be brought into a partially dismounted condition requiring little cargo space on railway wagons or on a truck. Thereafter, at the point of destination separated prong carriers can be remounted at the rake wheel by the receiver without any special skill. The rake wheel of the hay making machine is especially suited for the swathing of harvested goods and, in operation, is rotated about a substantially vertically aligned axis. Prong carriers provided with prongs at the outer ends are controlled in a control path by means of cam cranks with eccentrically arranged cam rollers. The control path is located within a closed casing formed as casting and having journal bearings formed as cast housings provided with a screw flange. These journal bearings are axially sleeved onto the prong carriers and form a bearing location for the same. A portion of a journal bearing together with an end of the prong carrier and a cam crank are adapted both to be introduced into a bore of the cam path housing and to be fixed to the cam path housing by means of a flange connection provided with screws. However, such housings formed by casting are very expensive and make necessary a number of difficult machining steps. Furthermore, it is disadvantageous that the force transfer from the prong carrier to the cam path housing is realized at one point by the screwing of the journal bearings to the cam path housing so that high load peaks are caused at this location.

In the European patent publication EP 0 590 311 A1 it is proposed to manufacture the housing body from two halves with contacting plane surfaces which are screwed with one another. In the range of their outer diameter the halves of the housing have protuberances into which outer journal bearings made of plastic are inserted. Additionally, the prong brackets are supported in inner journal bearings which are screwed with both halves of the housing. In order to replace a prong bracket of such a gyro, it is necessary to dismount the whole housing. This results in high mounting expenses and thus in high repair costs. Furthermore, it is problematic to seal a housing body with respect to the leakage of liquid or semi-liquid lubricants by means of plastic sleeves in which the prong brackets are rotatably supported.

It is the object of the invention to provide a rotary rake for a hay making machine, especially for a rotary windrower. Which overcomes the drawbacks of the prior art.

Still another object is to provide the rotary windrower with the gyro casing controllably receiving the prong brackets which is liquid or semi-liquid lubricant leaakage proof.

OBJECTS OF THE INVENTION

Yet another object is to provide the prong brackets which are mounted along with journal bearings and eccentrically disposed cam roller in the apertures of the gyro casing.

SUMMARY OF THE INVENTION

These objects are achieved by a rotary rake which is characterized in that the prong brackets, at the end provided for the support within the gyro housing, are provided with an eccentrically disposed cam roller and a journal bearing axially fixed on the prong bracket. Thus a compact subassembly is formed which is adapted to be inserted into and locked in at least two spaced apertures within the gyro casing which are disposed one behind the other and each of which forming a location of reception. The apertures forming the locations of reception provide a holding device of the journal bearing and thus of the prong bracket.

The inventive rotary rake for a hay making machine, especially for a rotary windrower, has a gyro casing which is completely sealed to the outside with respect to the leakage of liquid or semi-liquid lubricants and according to which it is possible to insert the prong brackets provided with a journal bearing and an eccentrically disposed cam roller as a mounted subassembly from the outside into apertures in the gyro casing provided therefor and to lock the same. For this purpose, the prong brackets are designed in such a manner that a journal bearing formed as bearing sleeve and provided with sliding bearing bushes is sleeved onto the prong bracket from the side provided for the support in the gyro casing and can be axially fixed on the prong bracket by means of a cam arm provided with a cam roller. A durable sealing of the prong brackets with respect to the journal bearings is achieved by a radial sealing ring associated with the journal bearing so that the sliding bearing locations of the prong bracket in the journal bearings can be supplied with lubricant from the gyro casing by means of two bores provided in the journal bearings.

The mounting of the prong brackets in the gyro casing is realized in U-shaped pockets which have at least two apertures into which the journal bearing is insertable. These apertures are formed as bushings wherein the outer bushing at the side of the U-shaped pockets facing towards the prongs is a conical bushing. Since the journal bearing has also a projection having the shape of a truncated cone, a conical connection is generated when the journal bearings are introduced into the apertures of the gyro casing which connection can be self-locking and, in this case, does not need any further locking. However, it is also possible to secure the journal bearings with the prong brackets by a cover plate screwed on the flange side facing towards the prongs of the U-shaped pockets and to provide for a durable sealing by a sealing ring inserted into the parting line between the flange side and the cover plate.

Preferably, the gyro casing consists of a dimensionally stable casing lower part and a lid-shaped upper part, wherein the casing lower part contains a bottom plate and a cover round extending parallel with respect to the bottom plate and wherein the bottom plate and the cover round are connected by a ring-shaped web. The casing lower part is formed as a welded construction so that expensive mechanical machining steps are avoided. The ring-like web consists of joined U-shaped pockets formed as pressed part and having apertures in the flange sides forming the locations of reception for the journal bearings. The U-shaped design of the pockets is necessary, among others, on account of the fact since, when inserting the prong brackets with journal bearings and cam arm with cam roller, which are formed as compact subassembly, into the locations of reception of the gyro casing, at first the compact subassembly has to be introduced in a slightly pivoted manner until the cam roller has passed the inner location of reception facing towards the center of the gyro casing. For this, nearly the whole space between the two locations of reception of the pockets is necessary. Furthermore, one obtains a good distribution of the forces generated through the raking of the prongs and transferred from the prong brackets to the gyro casing by the U-shaped design or by the locations of reception of the pockets which are arranged in a spaced manner.

A rotary rake is provided by the above-described measures which is nearly maintenance-free by the use of liquid or semi-liquid lubricants in the gyro casing and which, in the repair case, can be repaired by a minimum of mounting efforts.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
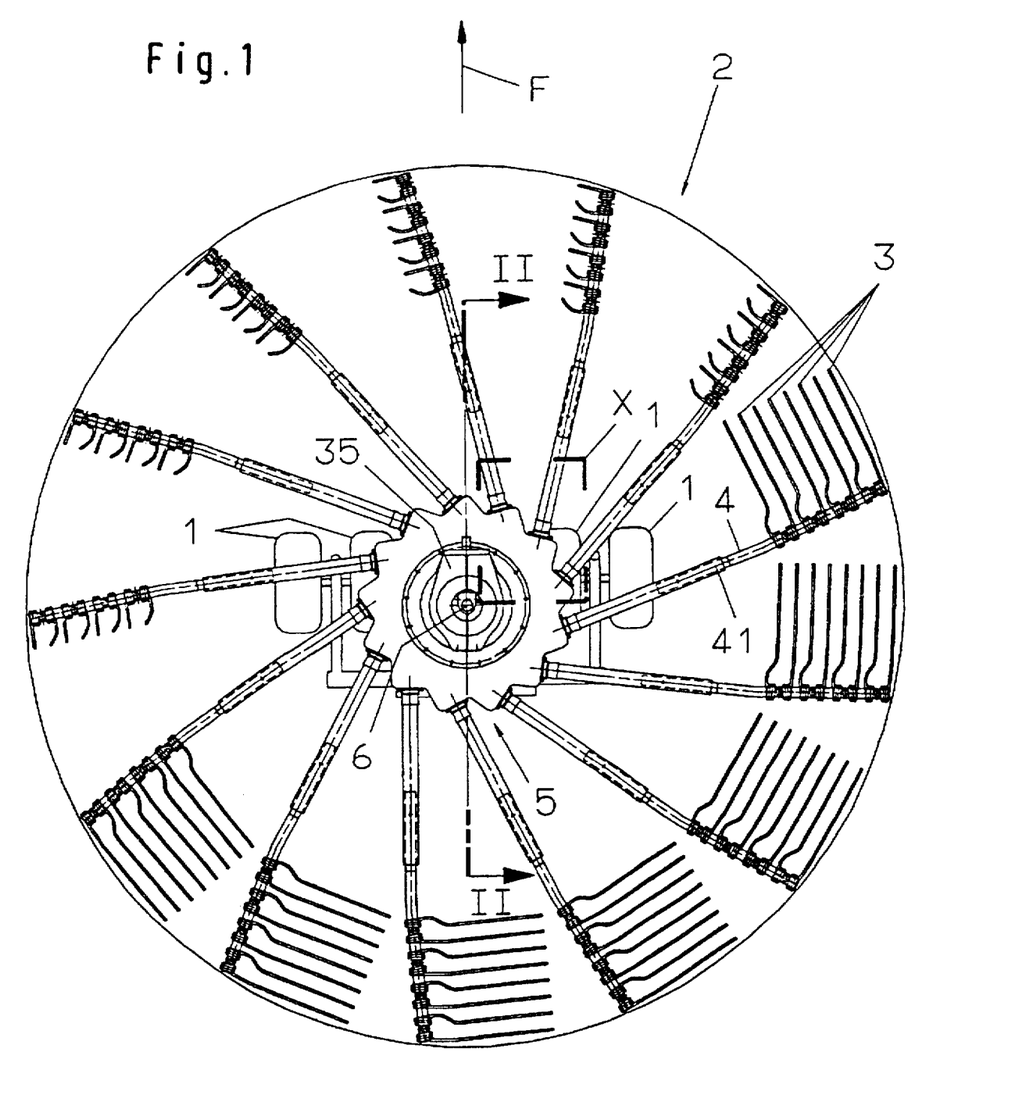
FIG. 1 is a plan view of the inventive rotary rake.
Figure 2:
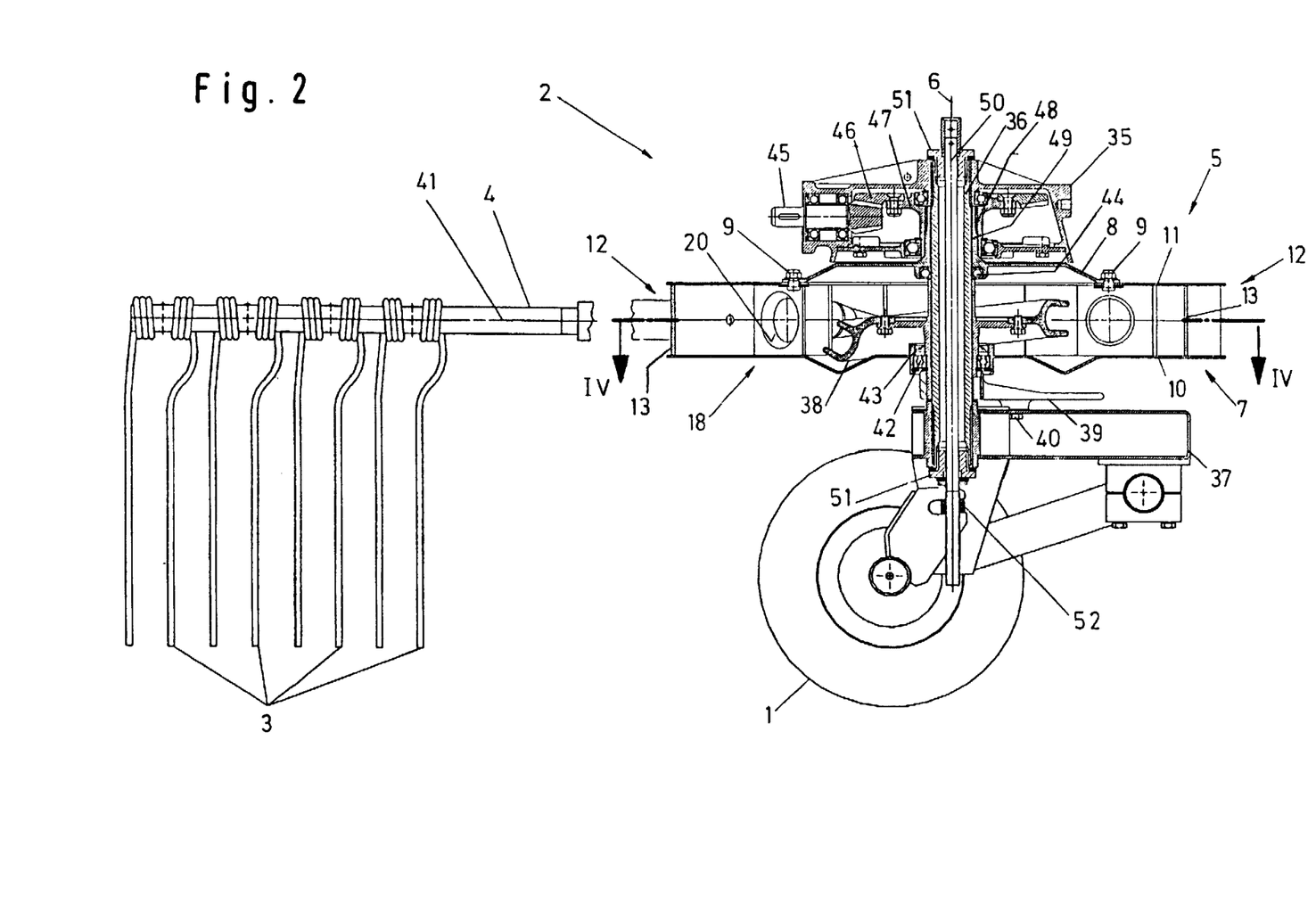
FIG. 2 is a sectional view according to the line II—II in FIG. 1, wherein only the forward prong bracket facing towards the drive direction with prongs is shown, partially broken.

The rotary rake 2 shown in FIGS. 1 and 2 is supported on the ground by means of height-adjustable support wheels 1 and includes prong brackets 4 provided with prongs 3 and rotatably supported within a gyro casing 5 and rotating with the same together about a substantially vertically aligned axis 6. The prong brackets 4 consist of two tube halves which are pluggable into one another and which are axially secured by means of a locking pin or similar securing members. Such rotary rakes are used with rotary windrowers having one rotary rake which are coupled to a three-point lifting device of an agricultural tractor by means of a support frame which is not shown. However, they can be also used with rotary windrowers having two or more rotary rakes, wherein the rotary rakes are arranged one besides the other or offset with respect to one another on a chassis moved by an agricultural tractor and not shown either.

Figure 3:
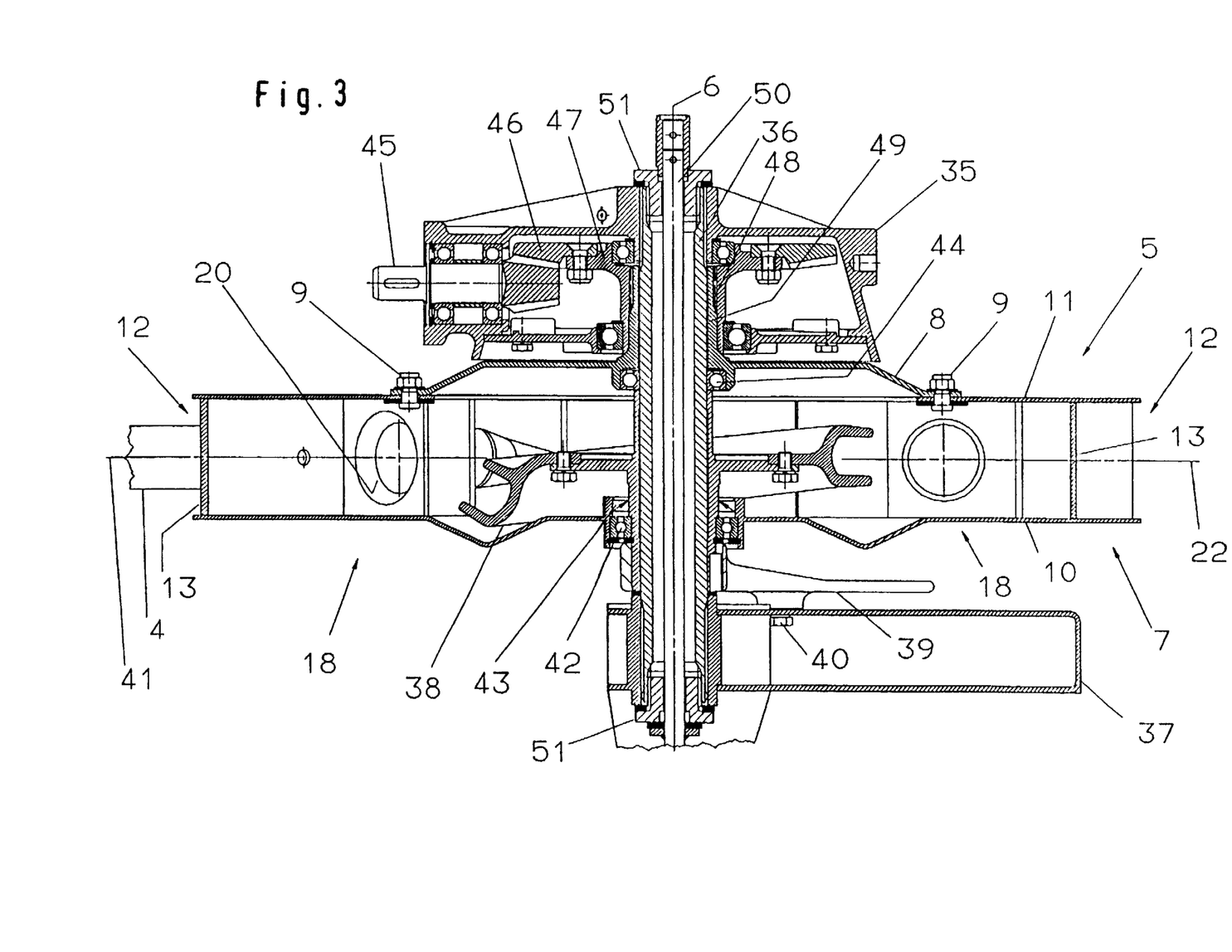
FIG. 3 is an enlarged, partially broken sectional view of the gyro casing with installed gear box similar to FIG. 2.

As shown in FIG. 2 and especially in FIG. 3, the rotary rake 2 includes a gyro casing 5 consisting of a dimensionally stable casing lower part 7 and a lid-shaped casing upper part 8. The casing lower part 7 is a sheet casing formed as welded construction and having a bottom plate 10 as well as a cover round 11 extending parallel with respect to the bottom plate in spaced relation thereto. A ring-like web connects the bottom plate and the cover round. The ring-like web 12 consists of U-shaped pockets 13 which, with the formation of an angle a with respect to adjacent pockets 13, are joined in such a manner that the flange side 14 of a pocket 13 facing towards the prongs 3 joins to a longitudinal side 16 of an adjacent pocket 13. The angle results from a full angle of 360° distributed on the number of prong brackets 4 with which a rotary rake 2 is provided (FIGS. 4 and 5).

Figure 6:
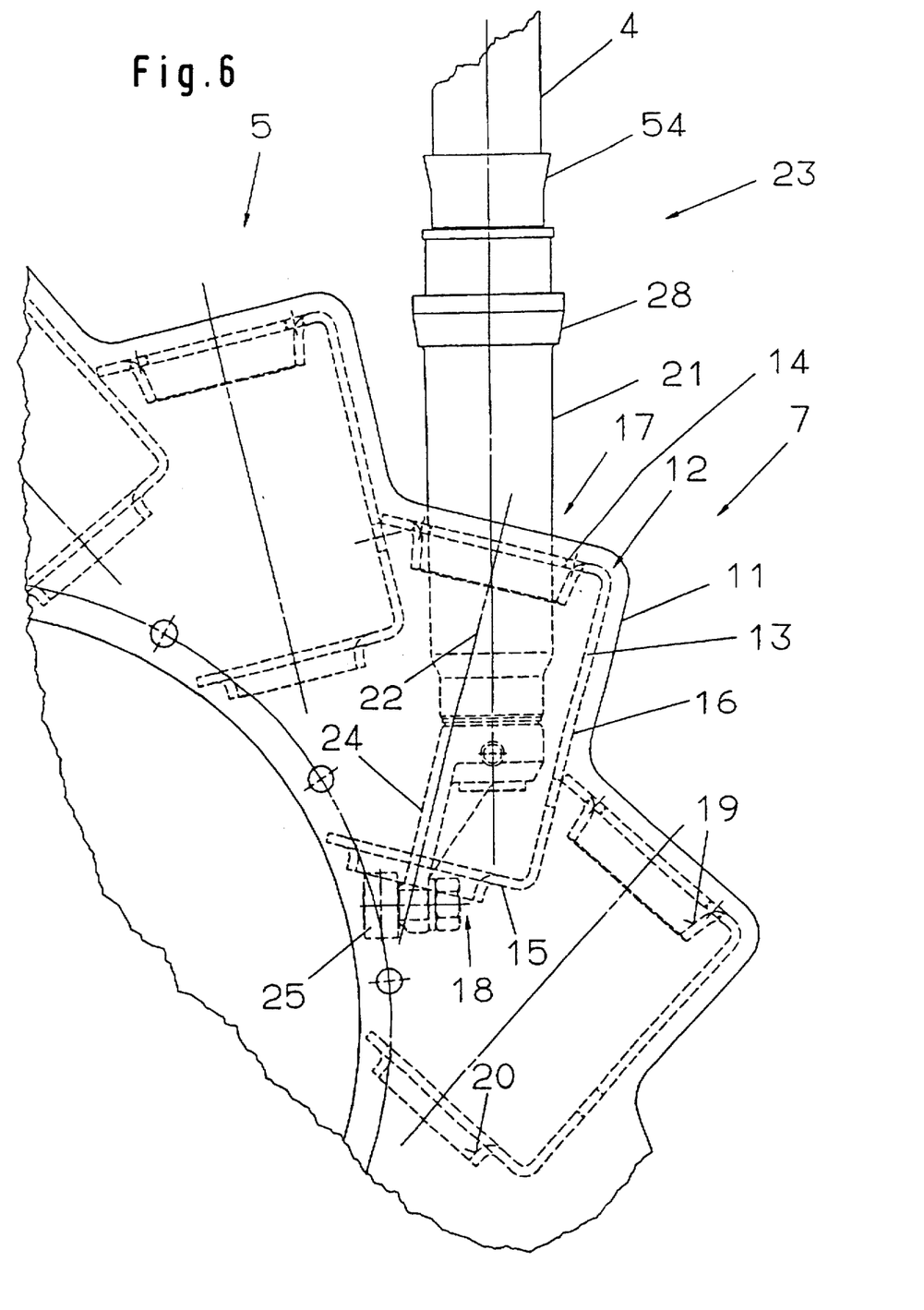
FIG. 6 is an enlarged, partially broken plan view of the detail X of the gyro casing, similar to FIG. 5, however, with a compact subassembly partially inserted into an aperture of the gyro casing and consisting of a prong bracket with a journal bearing and a cam arm with a cam roller.

The pockets 13 are canted U-shaped sheet profiles with flange sides 14, 15 and a longitudinal side 16, wherein the blank width of the sheet profile determines the distance between the bottom plate 10 and the cover round 11. The flange sides 14, 15 have apertures 17, 18 which are spaced at a distance and which are located on a respective common central axis 22 and form locations of reception 19, 20 for journal bearings 21 (FIG. 6). The distance between the apertures 17, 18 should be as large as possible since an optimum distribution of the forces introduced into the gyro casing is obtained. The minimum value is in a range of 150 to 180 mm. The aperture 17 at the flange side 15 of the pockets 13 facing towards the prongs 3 is designed as concical bushing and forms the location of reception 19, wherein the inner diameter decreases in the direction towards the center of the gyro casing 5. The second aperture 18 located further to the center of the gyro casing 5 is formed as bushing with constant inner diameter and is designated as location of reception 20. Both locations of reception 19, 20 are manufactured in one operation step, for instance with a pressing tool, so that each pocket has a common central axis 22 the respective apertures 17 and 18.

Figure 4:
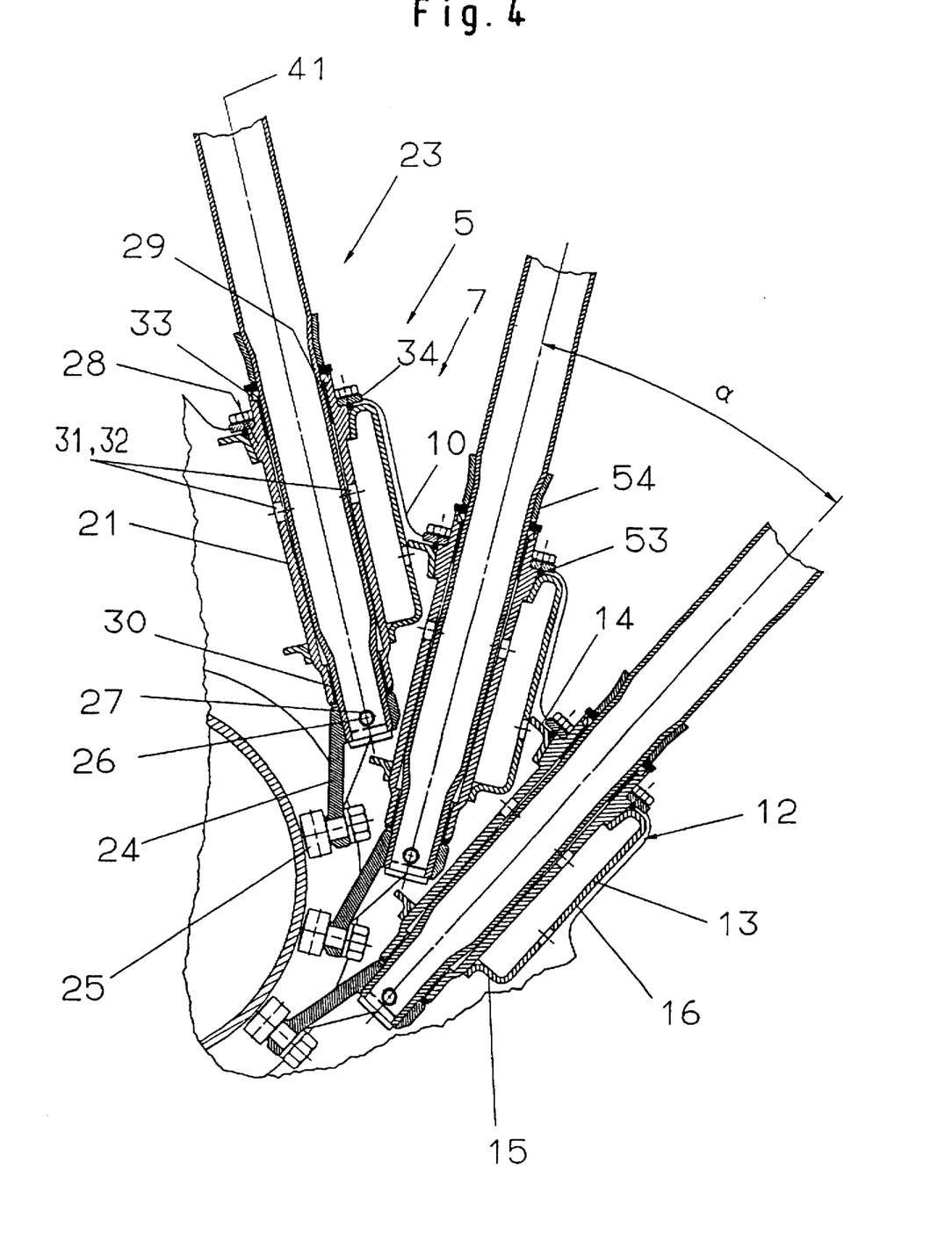
FIG. 4 is an enlarged, partially broken sectional view of the detail X in FIG. 1 according to the line IV—IV in FIG. 2.
Figure 5:
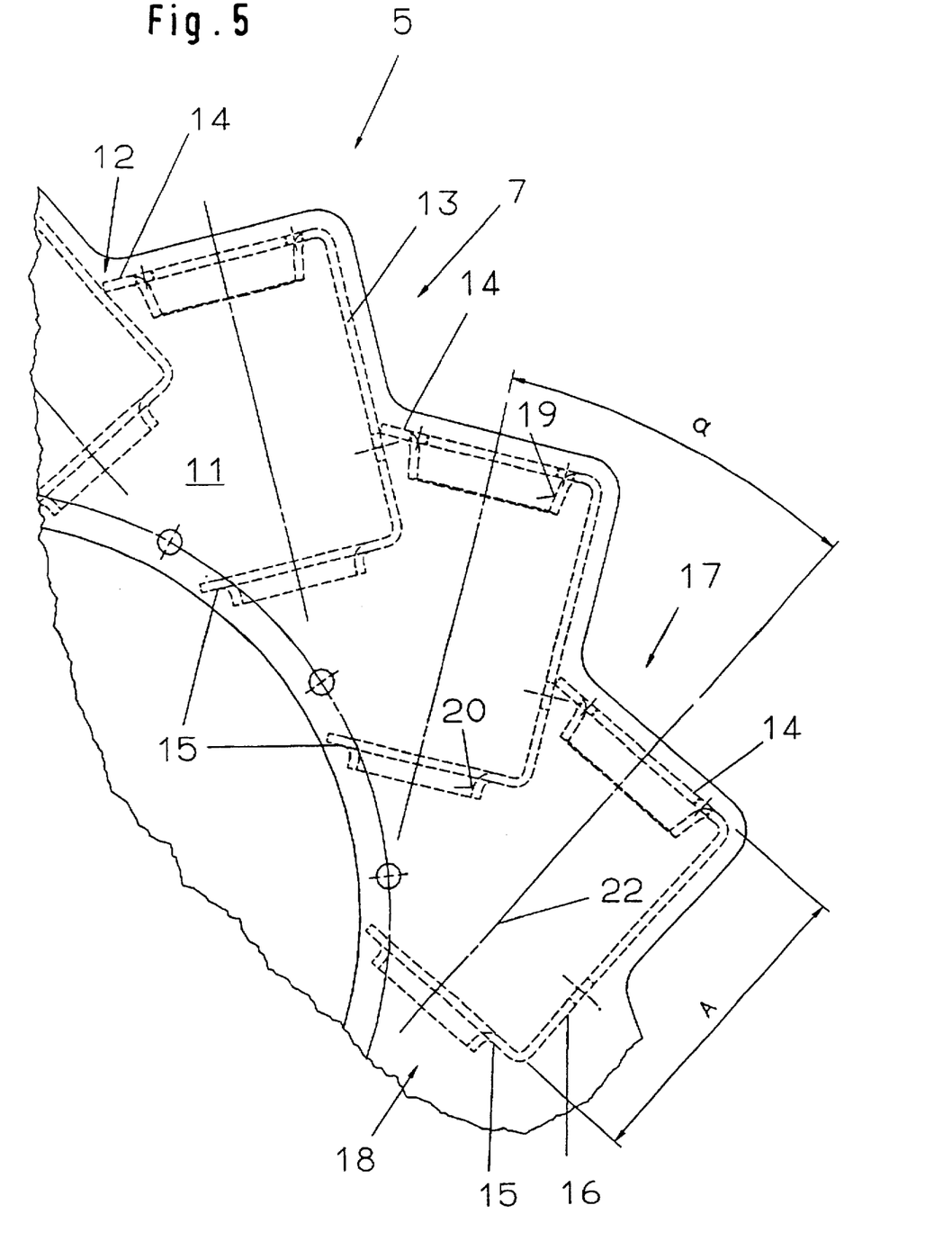
FIG. 5 is an enlarged, partially broken plane view of the detail X of the gyro casing from FIG. 1.

Additional components of the inventive rotary rake 2 are formed by prong brackets 4 mounted to compact subassemblies 23 FIG. 4 and having journal bearings 21 sleeved thereon from the side provided for the support within the gyro casing 5. These journal bearings are locked on the prong bracket 4 on the one side by a stop sleeve 54 and on the other side by a cam arm 24 having thereon an eccentrically secured cam roller 25. The cam arm 24 is axially fixed on the prong bracket 4 by means of a locking pin 27 or similar securing members which are adapted to be introduced into a bore 26. The journal bearings 21 are formed as bearing sleeves having a projection 28 in the shape of a truncated cone with a diameter decreasing towards the center of the gyro casing 5 on the side facing towards the prongs 3. Preferably, the journal bearings 21 can be cast from light metal, for instance aluminum, so that by this a weight reduction is obtained. The prong brackets 4 are rotatably supported in the journal bearing 21 by means of sliding bearing bushings 29, 30 or similar bearing members disposed in the end portion of the journal bearings 21, wherein the sliding bearing bushings 29, 30 can be lubricated with lubricant from the gyro casing 5 through bores 31, 32 substantially disposed in the central section of the journal bearings 21. A radial sealing ring 33 is associated with the journal bearings 21 on the side facing towards the prongs 3 in order to guarantee a durable sealing of the prong brackets 4 with respect to the journal bearings 21.

In FIG. 4 it is shown in an enlarged sectional view that a compact subassembly 23 is received and locked in the gyro casing 5. The forward part of the journal bearing 21 facing towards the center of the gyro casing 5 is in engagement with the location of reception 20 (FIG. 5) while the rear part of the journal bearing 21 facing towards the prongs 3 with the frustoconical projection 28 is inserted into the location of reception 19. By this, a conical connection is generated in the location of reception 19. The journal bearing 21 and thus the compact subassembly 23 is axially secured in the locations of reception 19, 20 of the pockets 13 by means of the cover plate 34 screwed onto the flange side 14. For sealing the gyro casing 5, a sealing ring 53 is provided in the parting line between the flange side 14 and the cover plate 34. This sealing ring seals the journal bearing 21 with respect to the gyro casing 5 when the cover plate 34 is firmly screwed on. By the selection of a corresponding cone angle, the conical connection of the location of reception 19 with the conical projection 28 of the journal bearing 21 can also be formed in such a manner that it becomes self-locking and the journal bearing 21 or the compact subassembly 23 does not need any further axial locking.

Furthermore, an angular transmission 35 (FIG. 3), which is connected to a frame member (not shown) in a manner fixed against torsion and which serves as mounting for the rotary rake 2, belongs to the construction of the rotary rake 2 (FIGS. 2 and 3). A hollow shaft 36 is mounted in the upper part of the angular transmission 35. The gyro casing 5 is rotatably supported on the hollow shaft below the angular transmission 35 and is locked towards the lower side by a mounting 37 for the support wheels 1 (FIG. 2). Furthermore, a cam path 38 is rotatably mounted on the hollow shaft 36 and is adjustable in several positions of adjustment by means of a screw 40 through an adjusting lever 39. It is the function of the cam path 38 to move the prong brackets 4 with the prongs 3 provided thereon by rotation about their central axis 41 during a rotation of the gyro casing 5 about the substantially vertical axis 6 from a rake position into an upwardly pivoted position for the swath formation and thereafter again into the rake position. This is realized by the guidance of the cam rollers 25 mounted at the ends of the prong brackets 4 through cam arms 24 during the rotation of the rotary rake 2 about the axis 6 in the cam path 38.

The support means for the gyro casing 5 consists of a ball bearing 42 (FIG. 2) disposed in the casing lower part 7 and supported on the hub of the cam path 38. A radial sealing ring 43 is disposed in front of the ball bearing. By this measure, also the casing lower part 7 is sealed against the leakage of lubricant. Another ball bearing 44 supports the casing upper part 8 with respect to the hollow shaft 36. The casing upper part 8 includes an upwardly directed hollow shaft portion 49 which is connected through a splined shaft connection 48 to a slip-on hub 47 screwed with a bevel gear 46 of the angular transmission 35. The height of the support wheels 1 can be adjusted by means of a shaft 50 which extends through the hollow shaft 36 with the tensioning nuts 51 and which is threaded at its lower end and engages a threaded connecting link 52.

The rotary rake 2 is driven by means of articulated shafts (not shown) from an agricultural tractor to the pinion shaft 45 of the angular transmission 35. From there, the drive force is transferred to the gyro casing 5 through the slip-on hub 47 associated with the bevel gear 46 and positively connected to the hollow shaft portion 49 inserted into the casing upper part 8 by means of the splined shaft connection 48.

FIG. 6 shows a partially broken view of the gyro casing 5 with the not yet completely introduced compact subassembly 23 also shown in a broken manner. From this representation it becomes clear that, when inserting the compact subassembly 23 into the locations of reception 19, 20 of the pockets 13, the compact subassembly 23 at first has to be introduced in a slightly tilted manner until the cam roller 25 positioned at the cam arm 24 has passed the location of reception 20. For this, nearly the whole space between the locations of reception 19, 20 of the pockets 13 is used.

Figure 7:
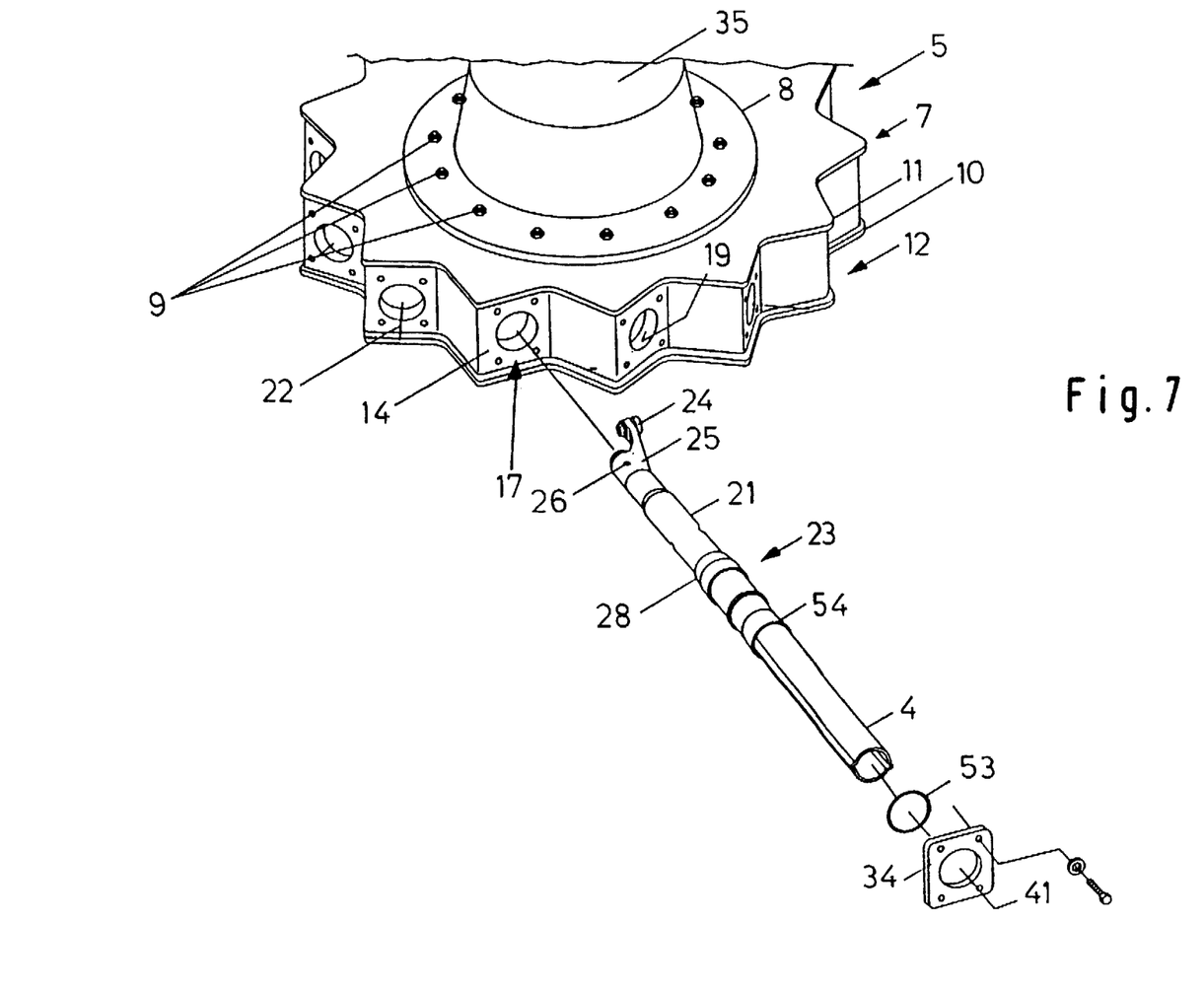
FIG. 7 is a prospective, partially broken view of the gyro casing with a compact subassembly arranged in front of an aperture.

FIG. 7 shows a perspective view of the gyro casing 5 with put-on angular transmission 35 and of a compact subassembly 23 shown in a partially broken manner and positioned in front of the aperture 17. This view serves for a better spatial representation of the invention. As shown, according to the invention it is possible to insert the prong brackets 4, provided with a journal bearing 21 as well as a cam arm 24 with cam roller 25, as compact subassembly 23 into the gyro casing 5 in such a manner that the gyro casing 5 is an assembly sealed against the leakage of lubricants. Furthermore, this figure shows that, in the case of repair, a defective prong bracket, for example, can be replaced with a minimum of mounting efforts.

We claim:

1. A hay making machine comprising:

a closed gyro housing rotatable about a vertical axis;

a plurality of angularly offset brackets rotatably fixed on said gyro housing, each of said brackets extending along a respective horizontal bracket axis and being formed with a respective pair of apertures spaced axially from each other along the respective horizontal bracket axis;

a plurality of journal bearings, each of the journal bearings received in the respective pair of apertures of the respective bracket and being axially fixed thereon;

a plurality of prong arms each received in the respective journal bearing and extending along the respective horizontal bracket axis and formed with a respective plurality of prongs on a respective outer end of the arm;

a plurality of cam rollers in said gyro housing and rotatable therewith along a cam path, each of the cam rollers being operatively connected with the respective bracket and centered on a respective horizontal cam axis angularly offset with respect to the horizontal axis of the respective bracket; and cam means in said gyro housing cooperating with said cam rollers for pivoting each of said prong arms between respective rake and swath formation positions upon displacing said rollers along said cam path.

2. The hay making machine defined in claim 1, further comprising:

a plurality of stop sleeves, each of the sleeves being coaxial with the respective journal bearing and supporting an outer end thereof, a plurality of cam arms, each of the cam arms connecting the respective cam roller and an inner end of the respective journal bearing and supporting the inner end, each cam arm being provided with a respective bore, and a plurality of pins, each of the pins being received in the respective bore and rigidly connecting said arm and the respective bracket, so that each journal sleeve received in the respective pair of apertures is locked axially between the respective stop sleeve and the respective cam arm.

3. The hay making machine defined in claim 2 wherein each of said journal bearings is provided with a respective pair of sliding bearing bushes spaced axially apart to support the respective bracket rotatably and with respective means forming bores on the respective journal bearing between the respective inner and outer ends thereof for providing access of lubricant to the respective pair of sliding bearing bushes.

4. The hay making machine defined in claim 2 wherein each of said brackets, journal bearings and cam arms and rollers form a respective compact subassembly.

5. The hay making machine defined in claim 2 wherein the respective outer end of each journal bearing is formed with projection, said projection being received in one of the apertures of the respective pair and being a truncated cone formed with a peripheral surface which tapers inwardly.

6. The hay making machine defined in claim 5 wherein apertures forming the respective pair are centered on the respective bracket axis, the one aperture of each pair, formed in an outer flange of respective bracket, having a conical peripheral surface which complements the peripheral surface of the truncated cone of the respective journal bearing to provide self-locking of the journal bearing upon mounting thereof on the respective bracket.

7. The hay making machine defined in claim 1 wherein each of said journal bearing is made of light metal.

8. The hay making machine defined in claim 2 wherein the outer end of each journal bearing is provided with a respective sealing ring provided between the journal and respective bracket.

9. The hay making machine defined in claim 1 wherein said gyro housing is formed with dimensionally stable lower and lid-shaped upper parts spaced from one another along said vertical axis, said parts being bridged by said plurality of brackets, each of the brackets having a respective longitudinal side bridging a respective pair of outer and inner flanges each of which is formed with a respective aperture of the pair of apertures and adjoining one of the flanges of the adjacent bracket.

10. The hay making machine defined in claim 9 wherein said lid-shaped upper part of the gyro housing is round.

11. The hay making machine defined in claim 9 wherein lid-shaped upper part is screwed onto each outer flange of the plurality of the brackets.

12. The hay making machine defined in claim 11 wherein said lid-shaped upper part is provided with a plurality of O-rings sealing the connection between said outer flanges and said lid-shaped upper part.

13. The hay making machine defined in claim 9 wherein the other aperture of the pair of apertures has a constant inner diameter, the apertures of each pair being axially spaced from one another at a distance ranging between 150 and 180 mm.

14. The hay making defined in claim 1 wherein each of the brackets provided with the respective pair of apertures is formed as a respective press part.

* * * * *